United States Patent
Tormey et al.

[15] 3,666,053
[45] May 30, 1972

[54] VEHICLE LIFT

[72] Inventors: Robert M. Tormey, Dayton, Ohio; John G. Petry, San Jose, Calif.

[73] Assignee: J. D. Cochin Manufacturing Company, San Francisco, Calif.

[22] Filed: Jan. 6, 1970

[21] Appl. No.: 993

Related U.S. Application Data

[63] Continuation-in-part of Ser. No. 648,911, June 26, 1967, abandoned.

[52] U.S. Cl. .................................. 187/8.50, 187/9, 188/67
[51] Int. Cl. ........................................................ B66f 7/02
[58] Field of Search .................. 187/8.41, 8.47, 8.5, 8.49, 187/8.75, 9, 95; 188/67; 92/8

[56] References Cited

UNITED STATES PATENTS

| | | | |
|---|---|---|---|
| 2,274,304 | 2/1942 | Perry | 188/67 |
| 2,415,655 | 2/1947 | Reinert | 187/9 |
| 2,857,985 | 10/1958 | Simmons | 187/8.41 |
| 3,315,571 | 4/1967 | Hott et al. | 92/8 |
| 3,362,503 | 1/1968 | Stoilov | 187/95 |
| 3,415,342 | 12/1968 | Hott | 187/8.41 |

Primary Examiner—Evon C. Blunk
Assistant Examiner—Merle F. Maffei
Attorney—Townsend and Townsend

[57] ABSTRACT

A vehicle lift employing a fluid actuated, vertically mounted power device having a shiftable portion connected by a mount to a vehicle lift plate which extends laterally from the power device. The mount has roller means for engaging the outer surface of the power device to equalize the load of a vehicle on the lift plate. The lift plate has support arms for engaging the underside of a vehicle after the latter has been moved onto the lift plate and before the lift plate is elevated by actuation of said power device.

3 Claims, 8 Drawing Figures

Patented May 30, 1972 3,666,053

INVENTORS
ROBERT M. TORMEY
BY JOHN G. PETRY
Townsend & Townsend
ATTORNEYS

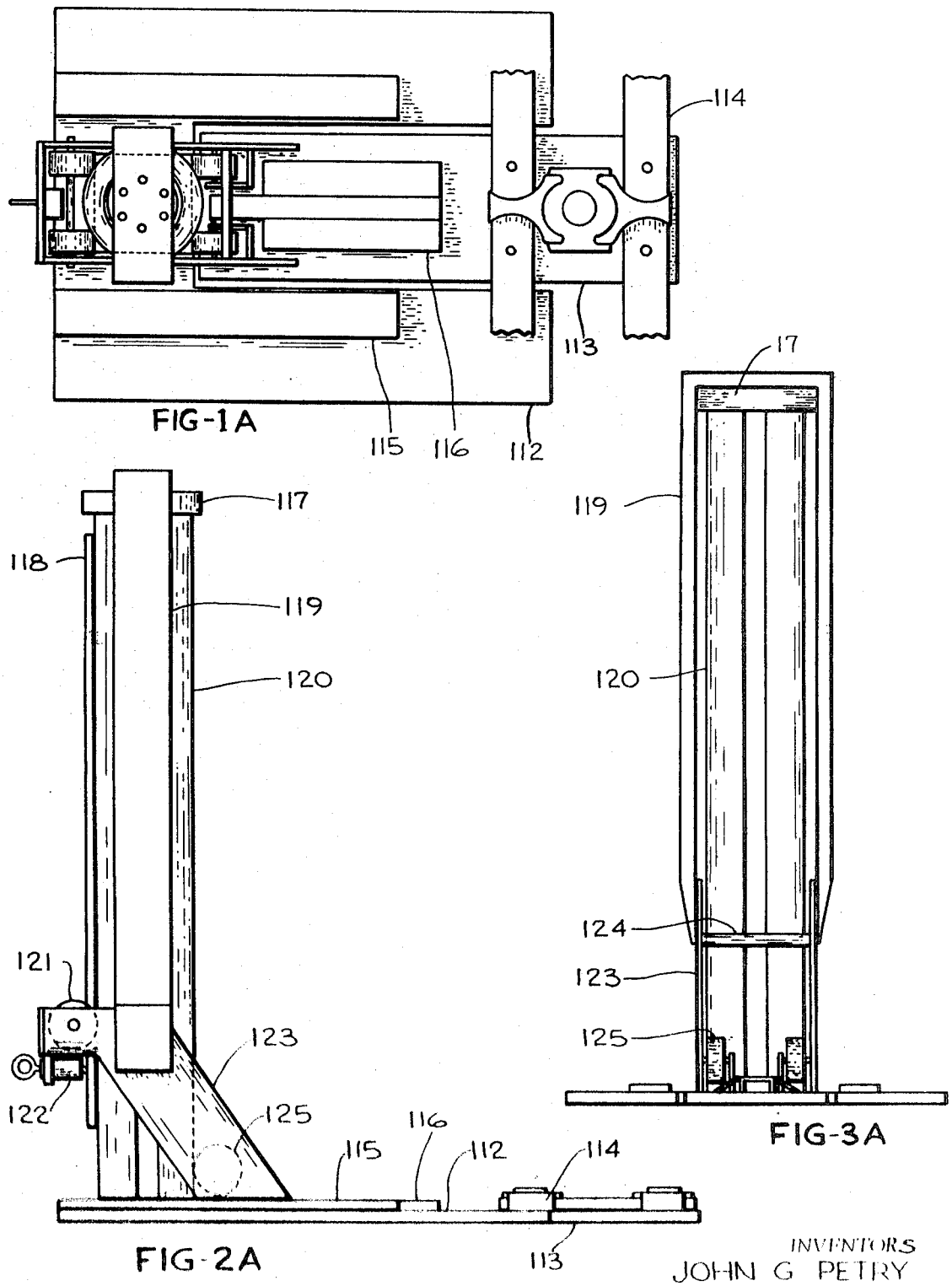

Patented May 30, 1972

INVENTORS
JOHN G. PETRY
BY ROBERT M. TORMEY
Townsend & Townsend
ATTORNEYS

VEHICLE LIFT

This is a continuation-in-part application of application Ser. No. 648,911, filed June 26, 1967, entitled VEHICLE LIFT, now abandoned.

This invention relates to improvements in vehicle hoists and more particularly to a vehicle lift that can be mounted directly on a surface over which a vehicle can move.

Conventional vehicle lifts generally include a fluid piston and cylinder assembly embedded in or otherwise mounted beneath a support surface over which a vehicle may move. This allows the vehicle to be driven onto the lift and then elevated from beneath when the piston is forced out of the cylinder and upwardly from the support surface. This construction, therefore, requires that a hole or pit be formed in and below the surface to accommodate the piston and cylinder. An installation of this type is permanent and also involves considerable expense not only in the cost of the lift components themselves but in providing a satisfactory mounting or foundation therefor. The mass below the surface must have depth at least equal to the major portion of the cylinder length to assure sufficient lateral support. This latter requirement, therefore, rules out the use of a conventional lifts on the first floors of a building having a basement and all upper floors of a multistoried building. A conventional lift is impractical for use on a temporary basis for, if the lift is to be moved to a new site, considerable time, effort, and expense is required to remove it from its embedded position below a first surface and to reposition it below a second surface.

The present invention avoids the above problems by providing an improved vehicle lift which is simple and rugged in construction, is inexpensive to produce and maintain, and can be used on any supporting surface on a temporary basis as well as a permanent installation. Its primary distinguishing characteristic resides in the fact that it can be readily mounted on rather than in a supporting surface over which a vehicle may move. To this end, a power device including a fluid piston and cylinder assembly is secured to and extends upwardly from one end of a base plate above which a vehicle lift plate is disposed. The lift plate is carried by a mount connected to the piston of the assembly so that the lift plate, extending laterally from the cylinder, can be raised and lowered thereby. A number of arms are pivotally mounted on the upper surface the lift plate and are disposed to engage the underside of a vehicle to be lifted after the vehicle has been moved over the support surface and onto the lift plate. The base plate allows the piston and cylinder assembly to be readily mounted on the support surface and also hold the assembly in its upright position against a load on the lift plate. The mount for the lift plate is of improved construction to permit loads on the lift plate to be carried by the cylinder of the power device.

One embodiment of the apparatus provides a 1:1 lift ratio between the lift plate and the lifting piston of the assembly. This is accomplished by the use of a pair of rigid sideplates interconnecting the lift plate mount and the piston. A second embodiment provides for lifting ratio greater than 1 between the lift plate and the piston. This is achieved by the use of a pair of flexible connecting members, such as chains or the like, which are secured at one end to the lift plate and at the opposite end to the cylinder. Each connecting member passes over and engages a bearing element, such as a sprocket, carried by the piston. Thus, a mechanical advantage of 2 is obtained.

The lift of this invention can be provided with a safety latch to prevent movement of the lift plate in a predetermined direction. The latch can be carried by the lift plate mount and is constructed to form a ratchet when the lift plate is being elevated, or upon being reversed in position, can be caused to form a ratchet when the lift plate is lowered.

The primary object of this invention is to provide an improved vehicle lift of the type which can be mounted directly on a support surface over which a vehicle can pass wherein the lift has a lift plate provided with a mount of improved construction for shiftably attaching the lift plate to the power device of the lift to more effectively distribute loads on the lift plate.

A further object of this invention is to provide a vehicle lift of the type described wherein the lift has a safety latch of improved construction which can operate as a ratchet when the lift plate is being moved in a predetermined direction while serving to prevent movement of the lift plate in the opposite direction.

Other objects, features and advantages of the present invention will become apparent upon reading the following specification and referring to the accompanying drawings in which similar characteristics of reference represent corresponding parts in each of the several views. In the drawings:

FIG. 1A is a top plan view of a second embodiment of the vehicle lift;

FIG. 2A is a side elevational view of the embodiment of FIG. 1A;

FIG. 3A is a front elevational view of the lift of FIG. 1A;

Figure 2:
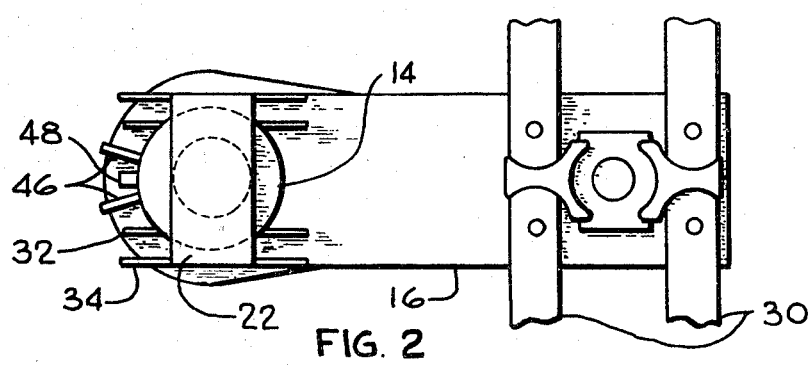
FIG. 2 is a top plan view of the lift.
Figure 1:
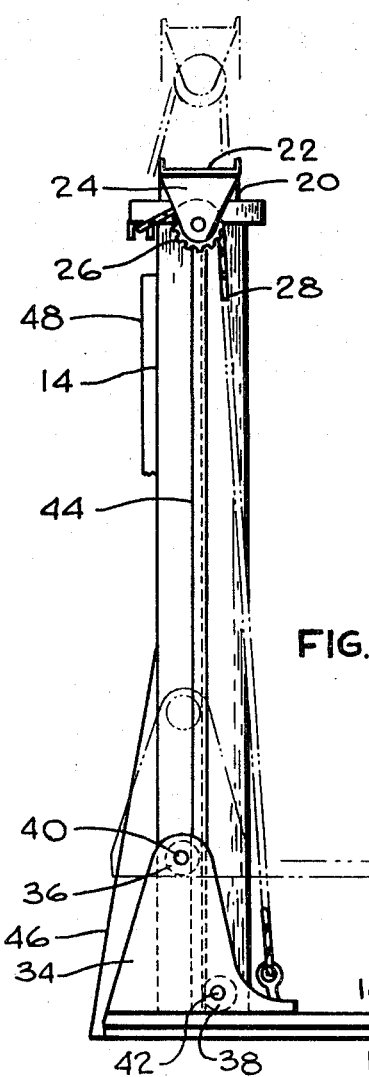
FIG. 1 is a side elevational view of one embodiment of the vehicle lift, showing lowered and partially elevated positions of the lift plate thereof.
Figure 3:
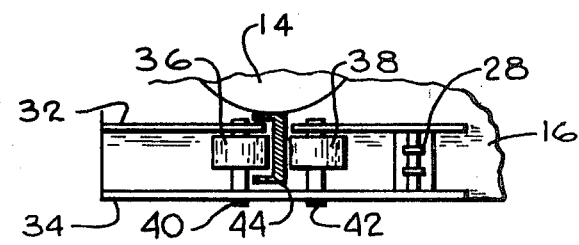
FIG. 3 is an enlarged, fragmentary plan view, partly in section showing the mount for the lift plate.

A first embodiment of the vehicle lift is denoted by the numeral 10 and is illustrated in FIGS. 1–3. Lift 10 includes a base plate 12, a fluid-actuated power device 14 mounted on and extending upwardly from one end of base plate 12, and a lift plate 16 overlying base plate 12 and operably coupled to power device 14 for up and down movement. Lift 10 is adapted to be rigidly secured to a suitable support surface, such as the floor of a building, over which a vehicle may move. Thus, when lift plate 16 is in its lowermost position, as shown in FIG. 1, the vehicle may be driven onto the lift plate and be raised by the latter when the lift plate is elevated by power device 14.

Any suitable means may be used to secure base plate 12 to a supporting surface. This plate may be secured by bolts or other suitable fasteners so that a temporary mounting or a permanent mounting can be achieved. A temporary mounting, however, allows the lift to be moved to a second site without disturbing the supporting surface.

Power device 14 includes a fluid-actuated piston and cylinder assembly including a cylinder 18 rigidly secured at its lower end to base plate 12, and a piston 20 telescopically received within cylinder 18 at the open upper end thereof. Conduit structure (not shown) is coupled with the bottom of cylinder 18 and is adapted to be coupled to a source of fluid under pressure for directing a fluid into the bottom of cylinder 18, whereby the piston can be raised and thereby moved out of the cylinder. Removal of the fluid from the bottom of the cylinder allows the piston to be lowered into the cylinder. A suitable fluid flow control is provided for the conduit structure.

A top plate 22 secured to the upper end of piston 20 has a pair of depending extensions 24 at its ends, each extension 24 having a sprocket 26 rotatably mounted thereon. Each sprocket has a link chain 28 passing over it, one end of the chain being secured to the upper end of cylinder 18 (FIG. 1) while the opposite end of the chain is secured to lift plate 16. By connecting the lift plate to the piston in this manner, a mechanical advantage of 2 is achieved in that the lift plate will move twice the distance of movement of piston 20.

A pair of flexible cables can be used in place of chains 28, if desired. If cables are used, sheaves will be used in place of sprockets 26.

Lift plate 16 has a number of arms 30 pivotally mounted thereon adjacent to the end thereof remote from cylinder 18. Arms 30 are movable from the positions of FIG. 2 into positions underlying the frame of a vehicle to be lifted after the vehicle has been moved onto lift plate 16. The arms engage structural members on the vehicle undercarriage and thereby support the vehicle when lift plate 16 is elevated. The pivotal mounting of the arms allows the latter to be returned to their retracted positions shown in dashed lines, whereby the vehicle can then be driven off the lift plate.

Lift plate 16 has a pair of upright triangular plates 32 and 34 on each side of cylinder 18, respectively. An upper roller 36 and a lower roller 38 are disposed between each pair of plates 32 and 34 in offset relationship as shown in FIG. 1. Rollers 36 and 38 are mounted for rotation by suitable shafts 40 and 42, respectively, with the rollers engaging opposed sides of a respective, adjacent, transversely C-shaped bar or channel member 44 rigid to and extending along a respective outer side surface of cylinder 18. Channel members 44 are diametrically opposed to each other on cylinder 18 and extend substantially the entire length of the latter.

Plates 32 and 34 and their rollers 36 and 38 provide a mount for lift plate 16, whereby the lift plate is cantilevered on cylinder 18. The mount has a construction such that the load on lift plate 16 is effectively distributed over the length of cylinder 18 rather than over other structure. A load on the lift plate tends to cause roller 36 to move to the left when viewing FIG. 1 and tends to cause roller 38 to move to the right when viewing FIG. 1. Cylinder 18 is strengthened by the use of a pair of webs 46 which rigidify the connection between plate 12 and cylinder 18.

In operation, piston 20 is at its lowermost position and arms 30 are in the dashed line positions of FIG. 2. A vehicle is then driven onto lift plate 16, following which arms 30 are swung outwardly so as to underlie structural parts on the vehicle undercarriage. Power device 14 is then actuated to cause piston 20 to be raised out of cylinder 18. This causes lift plate 16 to be elevated to, in turn, lift the vehicle disposed therein. The lifting force of piston 20 is transmitted to the left plate by chains 26 and, because of the mechanical advantage of the chain and sprocket arrangement, lift plate 16 moves twice the distance of piston 20. With the vehicle in an elevated position, it can be serviced as required.

A second embodiment of the lift of the invention is shown in FIGS. 1A, 2A, 3A, 4 and 5. This lift includes a base plate 112 adapted to be rigidly secured in any suitable manner to a support surface or floor. A power device is secured to and extends upwardly from one end of the base plate. This power device is comprised of a fluid piston and cylinder assembly, the piston of the assembly being coupled to a lift plate 113 for raising and lowering the same.

The lift plate is secured by a mount to a pair of lift side plates 119 which are secured at their upper ends to a cross piece connected to the piston. A mount interconnects the lower ends of plates 119 to lift plate 113, the mount having a pair of inclined sides 123. Lift plate 113 is provided with swingable arms 114 at the end remote from the power device and these arms serve the same purpose as arms 130 of lift 10.

Figure 5:
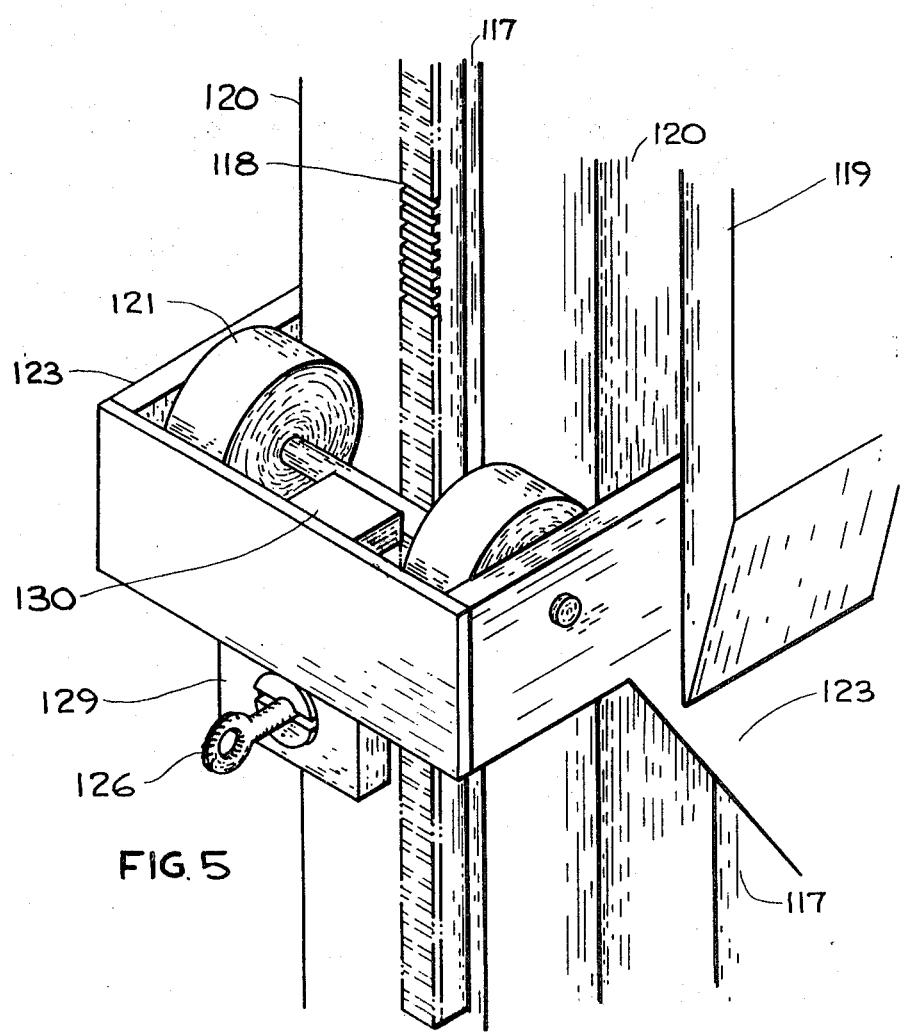
FIG. 5 is an enlarged, fragmentary prospective view of the embodiment of FIG. 1A.

The cylinder of the power device is transversely circular and is provided with four angle members 120, only two of which are shown in FIG. 5. Each angle member 120 presents a surface for a bearing roller coupled to the mount which interconnects plates 119 and lift plate 113. As shown in FIG. 3A, a pair of rollers 125 are rotatably mounted on respective sides 123 adjacent to the lower ends of the sides. These rollers bear against the adjacent flat surfaces of members 120 at the front of the power device. A second pair of rollers 121 are rotatably mounted on rearward extensions of sides 123. Rollers 121 engage the adjacent flat surfaces of angle members 120 at the rear of the power device. Thus, a load on lift plate 113 will be distributed effectively over the outer surface of the cylinder of the power device.

A safety latch is provided on the power device and includes a rack 118 which extends longitudinally of the power device. A latch member 127 is carried by a support 129 on the cross piece which interconnects the rearward extensions of sides 123. The latch member has a ring 126 permitting manual removal of the latch member from an operative position between a pair of teeth of the rack. A pin is carried on the shaft of the latch member and is received within opposed slots of the body 122 within which the latch member reciprocates. A coil spring 128 biases the latch member toward rack 118.

Figure 4:
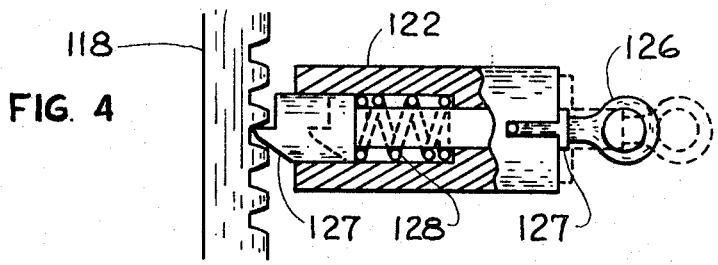
FIG. 4 is an enlarged, fragmentary view of the safety latch for each embodiment of the invention.

The latch member can rotate from the position shown in FIG. 4 to an inverted position through an angle of 180°. In the position shown in FIG. 4, the latch member can serve as a ratchet as it moves downwardly relative to rack 118. When the latch member is reversed from the position of FIG. 4, such as by rotating it through an angle of 180° about the axis of its shaft, the latch member will then be in a position to serve as a ratchet as it moves upwardly relative to the rack. This means that the latch member will serve as a safety device to prevent downward movement of the lift plate until the latch member is moved out of the space between a pair of teeth of the rack. To keep the latch member away from the rack, it can be pulled out from the rack and then rotated through an angle of 90° so that the pin engages the outer face of body 122 as shown in dashed lines in FIG. 4.

In use, a vehicle is driven over the rigid plate following which arms 114 are pivoted relative to the lift plate until they underlie the frame of the vehicle. The power device is then actuated to raise plates 119, sides 123 and thereby vehicle plate 113. The load exerted on the lift plate is uniformly distributed along the power device by virtue of the engagement of rollers 121 and 125 on respective angle members 120. Since plates 119 rigidly interconnect the piston of the power device and the lift plate, there will be a 1:1 lift ratio provided by the embodiment of FIG. 2A.

We claim:

1. In a vehicle lift: a base plate; a vertically disposed fluid actuated power device mounted on and extending upwardly from said base plate adjacent to one end thereof, said power device including a cylinder and a piston reciprocally mounted in the cylinder, said cylinder having a front and a pair of opposed sides, each side having a pair of opposed, flat, outer bearing surfaces; a lift plate extending laterally from the front of the cylinder; a pair of spaced side plates coupled with said lift plate and disposed at respective sides of the cylinder, each side plate having a pair of vertically spaced rollers engaging respective outer bearing surfaces of said cylinder to thereby mount the lift plate on said power device for movement longitudinally thereof; a pair of chains, each chain being connected at one end to the lift plate and at the other end to the cylinder, said piston having a top plate thereon; a pair of sprockets secured to respective ends of the top plate, there being a sprocket for each chain, respectively, each chain passing over and being movable relative to the corresponding sprocket, whereby the chains provide a lifting ratio between said lift plate and said piston greater than a 1:1 ratio; a crosspiece at the back of the cylinder and interconnecting the side plates; and a safety device for releasably interconnecting the crosspiece and the power device, said safety device including a rack secured to the back of the cylinder and a latch member carried by the crosspiece, said latch member being shiftable relative to the rack so that the latch member can move into and out of coupled relationship thereto.

2. In a vehicle lift as set forth in claim 1, wherein said latch member has an end portion formed to permit the latch member to serve as a ratchet when the lift plate is moved in a predetermined direction.

3. In a vehicle lift as set forth in claim 2, wherein said latch member is rotatably mounted on the mounting means, whereby the latch member can be rotated through an angle of 180°.

* * * * *